Figure 1:
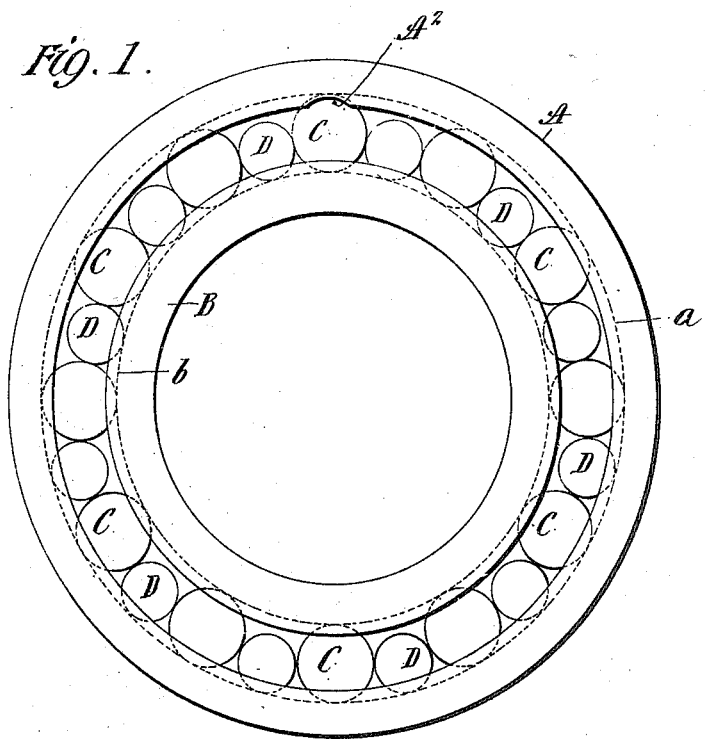

H. HESS.
ANTIFRICTION BEARING.
APPLICATION FILED FEB. 13, 1909.

983,897.

Patented Feb. 14, 1911.

Witnesses:

Inventor:
HENRY HESS
By his Attorneys

UNITED STATES PATENT OFFICE.

HENRY HESS, OF WAWA, PENNSYLVANIA.

ANTIFRICTION-BEARING.

983,897.

Specification of Letters Patent. Patented Feb. 14, 1911.

Application filed February 13, 1909. Serial No. 477,740.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

My invention relates to anti-friction bearings, and more particularly to that class thereof comprising casing members formed with tracks or ways and rolling elements located therein, together with rolling separators, which are of smaller diameter than the rolling elements, and which are interposed therebetween to properly space them in the manner well-known in the art. In this type of bearing the rolling elements or balls may be assembled in proper position in the raceway in any desired manner, this feature constituting no part of my invention, except that I prefer to so locate them by the eccentric displacement of the casing members, according to the well-known Conrad method, and especially by reason of the fact that this method permits me to utilize uninterrupted and continuous tracks or ways in the casing members, with all of the advantages that thereto accrue. The rolling separators, as before stated, are of smaller diameter than the rolling elements, and proper provision must be made to permit their insertion within the raceway after the rolling elements are assembled therein, and at the same time care must be taken not to weaken or otherwise affect the strength and general capabilities of the bearing. In one form of such bearings, wherein are employed spherical rolling separators of smaller diameter than the rolling elements, one of the casing members or rings is cut away throughout its entire circumference to an extent sufficient to permit the introduction of the separators between the rolling elements at any point in the periphery of the bearing. The opening thus formed is subsequently filled by a locking ring, which prevents the escape of the separators. The cut referred to, because of its extent, necessarily removes a considerable portion of the material of the casing member, and thus proportionately weakens the latter. Moreover, such construction may similarly reduce the capacity of the bearing to withstand side thrust, for the reason that if the bearing elements do not run exactly in the middle of the raceway, and should impinge against the separate locking ring, necessarily its power of resistance is less than would be that of a similar amount of metal forming an integral part of the casing member. And again, it sometimes happens that the separators themselves exert some side pressure or thrust, which in the instance described would be resisted only by the locking ring, which, as before stated, is not an integral portion of the casing member. To obviate the objections noted, and to provide a heavier bearing and one capable of resisting substantially to its full extent the end thrust to which it may be subjected, I propose to construct the casing members in their customary form, and with substantially the amount of metal or other material which would ordinarily be employed, thus insuring its greater strength and durability and increasing its capability to resist end thrust in a manner decidedly superior to that of the construction already mentioned. To this end, in place of the peripheral cut and locking ring described, I form in one or the other or both of the casing members a single filling opening of such size as to prevent the passage of the rolling elements therethrough, and large enough only to permit the passage of one separator at a time.

I have herein shown my invention in preferred form as applied to a type of ball bearing well-known in the art, and having continuous or uninterrupted raceways. However, I do not desire to be limited to the specific form shown, as my invention is capable of wider application, and, generally speaking, I desire it to be understood that it is not limited to any specific form or arrangement of parts, except in so far as such limitations are specified in the claim.

Figure 2:
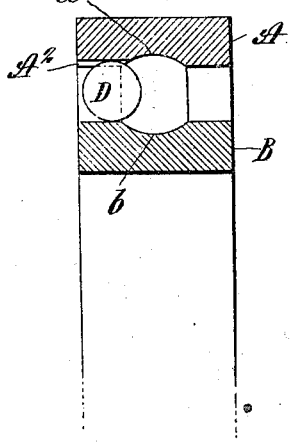
Figure 3:
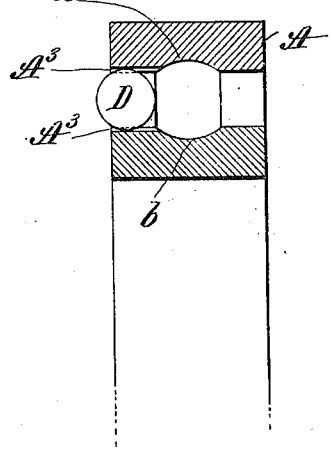

Referring to the drawing: Figure 1 is a side view of an anti-friction bearing embodying my invention; Fig. 2 is a transverse sectional view thereof; and Fig. 3 is a similar view illustrating a slight modification.

The anti-friction bearing illustrated comprises the outer casing member or ring A and the inner casing member or ring B, formed respectively with tracks or ways $a, b$, wherein are located the rolling elements or balls C, in the manner well-known in the art. Between the balls C—C are located the rolling or spherical separators D—D, which are of smaller diameter than the bearing balls C—C, but which, nevertheless, are of sufficient size to be held in the tracks or ways $a$, $b$, after their insertion in operative position. In order to permit this insertion and assemblage of the rolling separators, I form the outer casing member or ring A with a filling opening $A^2$, which filling opening is of such size as to prevent the passage of the rolling elements therethrough, as will appear clearly from the drawing, but is large enough to permit the passage of one separator at a time. By this arrangement, I am enabled to preserve substantially the continuity of the casing member or ring A, as well as its weight and strength, without diminishing its capacity to withstand side thrust, all in the manner previously described. In Figs. 1 and 2 the filling opening $A^2$ is shown as formed in the outer ring A, but obviously such filling opening is not necessarily located in the outer ring. Thus it might be formed in the inner ring B, or, if desired, it may be partly formed in both of the rings A, B, which latter variation is illustrated at $A^3$, $A^4$, in Fig. 3. The bearing generally may be assembled according to the well-known Conrad method, that is to say, by the introduction of the balls C—C into the raceway during the eccentric displacement of the casing members A, B, with reference to each other; after which the spherical separators D are introduced between the rolling elements in the way previously set forth. As described and shown, the filling opening for the separators is of such size and location as to permit the introduction of but one separator at a time, but, if desired, more than one of such filling openings may be located at different points in the casing members.

The gist of my invention relates to improving the prior form of bearing previously described, so as to prevent its being weakened, and the impairment of its capability to resist side thrust, as well as to dispense with the necessity for an additional part which must be connected to the bearing after the introduction of the separators. With these ends in view, many forms may be devised other than those herein illustrated, which I have shown only as preferred embodiments. Such equivalents will readily suggest themselves to those skilled in the art, and are equally comprised within the scope of my invention.

Having thus described my invention, its construction and mode of operation, what I claim and desire to secure by Letters Patent of the United States is as follows:

An anti-friction bearing comprising casing members formed with tracks or ways and rolling elements located therein, together with separators of smaller diameter than the rolling elements and located therebetween, the casing members being formed with an opening affording an individual filling-space with dimensions substantially the same as those of a single separator and smaller than the corresponding dimensions of a rolling element, said opening intersecting the raceway intermediate of the points of contact of said rolling elements with the working-faces of said tracks or ways to provide substantially continuous and uninterrupted side abutment walls or surfaces for said rolling elements, whereby side thrust will not effect displacement of said rolling elements into or through said opening, though, by reason of the smaller dimensional area of said opening, the passage of the separators one by one to and from the tracks or ways is permitted.

In testimony whereof I have affixed my signature in presence of two witnesses.

HENRY HESS.

Witnesses:
MARY MCCALLA,
NETTIE L. HAHN.